C. Norton.
Making Eye Bolts.
N° 56,599. Patented Jul. 24, 1866.
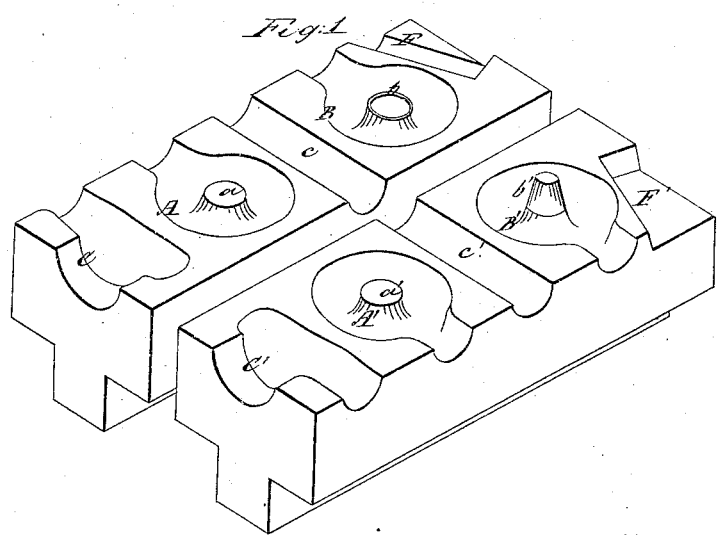
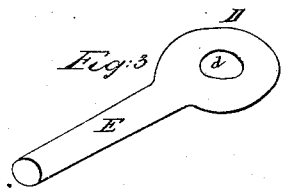
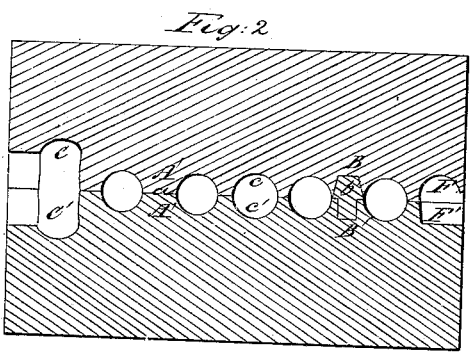
Witnesses
Jerome B. Lucke
R. Fitzgerald
Inventor
Charles Norton

UNITED STATES PATENT OFFICE.

CHARLES NORTON, OF NEW HAVEN, CONNECTICUT.

IMPROVEMENT IN DIES FOR MAKING EYEBOLTS FOR VESSELS.

Specification forming part of Letters Patent No. 56,599, dated July 24, 1866.

*To all whom it may concern:*

Be it known that I, CHARLES NORTON, of the city and county of New Haven, in the State of Connecticut, have invented a new and useful Improvement in the Manufacture of Eyebolts for Vessels, &c.; and I do hereby declare that the following is a full, clear, and exact description of the construction, character, and operation of the same, reference being had to the accompanying drawings, which make part of this specification, in which—

Figure 1 is a perspective view of the two parts of the forging dies or swage when open, showing all of their internal characteristics for shaping the eyebolt. Fig. 2 is a section of the two dies when together, cut vertically from end to end through the center. Fig. 3 is a perspective view of the finished eyebolt.

My improvement consists in forging the eyebolt of a piece of flat bar-iron by shaping and punching it by the use of suitable dies or swages in a drop or hammer frame, or in bending and welding the eye, and then bringing the article to its proper shape and condition by use of the dies, as before.

I make the lower part of the die or swage, or that part which is to be attached or keyed to the anvil block or bed, substantially of the shape or form shown at A B C, Fig. 1, and I make the upper part, or that which is to be attached or keyed to the drop or hammer, so as to form its face for that purpose, substantially as shown at A', B', and C', Fig. 1, being the reverse of A, B, and C, so as as to complete the form of the entire dies or swage for forming the eyebolt. I make each of these dies of malleable cast-iron, or any other suitable material, and harden them in the usual way or otherwise.

Near one end (or in any suitable position) of the two dies I make a depression, half in each, as shown at C and C', Fig. 1, and as put together at C and C', Fig. 2, of the right shape or concavity to form the external outlines of the eye of the bolt, as represented at D, Fig. 3; and toward the middle I make an annular depression in each, as represented at A and A', Fig. 1, and indicated at A and A', Fig. 2, with a part of the punch in the center of each, as shown at $a$ and $a'$, in which the shaped bolt (shown in Fig. 3) is placed to punch or form the eye $d$, Fig. 3.

I make the punches or formers of such a curve on their convex surfaces as they enlarge that they will give the proper curvilinear form to each portion of the eye that will suit the curve of the hook, which will be used to attach a block or bucket to it.

I make another pair of punches in the annular depression B and B' like A and A', one part of which, as $b$, I make hollow, and the other part, as $b'$, I make projecting like a cone, or a frustum of a cone, to enter and assist in giving the proper form to the eye in cases where the eye has been turned and welded.

Through the central part of each die, directly across, I make a semicircular groove or depression, as shown at $c$ and $c'$, in which I round the shank or bolt when necessary, and it is also suitable for welding when I make the welded eyebolt.

The spaces shown at F and F', Figs. 1 and 2, may be used for slitting down a part of the rod when the eye is to be made by welding.

Having made the dies as described, and shown in the drawings, I attach the lower die, A, B, and C, to the anvil block or bed, and the upper die, A', B', and C', to the drop or hammer in the usual way, so that the upper die, A', B', and C', will be directly over the lower die, A, B, and C. I then take a flat bar of iron of the proper width and thickness to make the eye part D, Fig. 3, and place the end of it edgewise into the space C, when the part C' will be brought down upon it and swage it to the shape D, Fig. 3, without being punched. I then place it flatwise onto the punch $a$ and bring down the punch $a'$ upon it, which will punch the eye, as $d$, Fig. 3, and completely shape or form the end, except, perhaps, a slight burr where the punches meet; but if I use round iron of the proper size I bend and weld it in the usual way, and then shape the eye by means of the dies B and B', Fig. 1, with the projecting conic punch $b'$; and if I use the projecting conic punch $b'$, I may take off the burr before mentioned, so that the eye $d$ may be made smooth at once, and perhaps that may be found to be the best punch for working flat bars of iron.

What I claim as my invention, and desire to secure by Letters Patent, is—

The combination of the lower die, A, B, and C, with the upper die, A', B', and C', when constructed, arranged, and fitted for making eyebolts substantially as herein described.

CHARLES NORTON.

Witnesses:
  JEROME B. LUCKE,
  R. FITZGERALD.